United States Patent [19]

Lewis

[11] Patent Number: 5,067,287
[45] Date of Patent: Nov. 26, 1991

[54] DISPLAY WALL ASSEMBLY

[76] Inventor: Kenneth T. Lewis, 77 Willett Crescent, Richmond Hill, Ontario, Canada, L4C 7W5

[21] Appl. No.: 542,876

[22] Filed: Jun. 25, 1990

[51] Int. Cl.5 .............................. G09B 5/06; B43L 1/10
[52] U.S. Cl. .......................................... 52/29; 52/64;
52/145; 272/10; 434/314; 434/408
[58] Field of Search ...................... 52/29, 64, 144–145;
434/314, 408; 272/10, 22

[56] References Cited

U.S. PATENT DOCUMENTS

| | | | |
|---|---|---|---|
| 3,084,933 | 4/1963 | Alswang | 272/10 |
| 3,531,898 | 10/1970 | Facemire | 272/10 X |
| 3,659,355 | 5/1972 | Aubin, Jr. | 434/408 |
| 3,728,801 | 4/1973 | Beckman et al. | 434/314 |
| 4,588,190 | 5/1986 | Stewart et al. | 52/64 X |
| 4,716,693 | 1/1988 | Webster | 52/64 |

Primary Examiner—John E. Murtagh
Assistant Examiner—Deborah McGann Ripley
Attorney, Agent, or Firm—Ridout & Maybee

[57] ABSTRACT

In accordance with the invention a wall assembly for displaying visual messages, has a front portion, a display area in the front portion, the display area providing an opening through the wall assembly, a projection screen for covering the opening, and a display panel movable from behind part of the front portion into the display area. The wall assembly can be placed before an audience and used to display visual messages which may be shown for example by projection onto a screen, or by writing on a display panel, with a facility for covering the display area when that area is not in use.

9 Claims, 8 Drawing Sheets 5,067,287

DISPLAY WALL ASSEMBLY

BACKGROUND OF THE INVENTION

The invention relates to a display wall assembly, useful in conferences, classes and the like.

OBJECTS OF THE INVENTION

An object of the invention is to provide a display wall assembly having flexibility to suit various visual or audiovisual needs.

Another object is to provide a display wall assembly which can be prefabricated in modules for quick and inexpensive erection in a variety of locations.

SUMMARY OF THE INVENTION

In accordance with the invention a wall assembly for displaying visual messages, has a front portion, a display area in the front portion, the display area providing an opening through the wall assembly, a projection screen for covering the opening, and a display panel movable from behind part of the front portion into the display area.

The wall assembly can be placed before an audience and used to display visual messages which may be shown for example by projection onto a screen, or by writing on a display panel, with a facility for covering the display area when that area is not in use.

The wall assembly can be prefabricated in modules, and can be disassembled, shipped and assembled quickly and inexpensively.

The display panel may include an erasable writing surface such as a whiteboard. One or more cover panels may be movable from behind part of the front portion to cover the display area. The front portion may be of sound absorptive material.

The rear portion of the wall assembly may be assembled with the front portion to provide between them a storage space for interaligning the display panel.

The wall assembly also includes means for supporting loudspeakers in the display area and means for driving the movable cover panel and display panel.

The invention will be more clearly understood by reference to the accompanying drawings illustrating by way of example one embodiment thereof.

DESCRIPTION OF THE PREFERRED EMBODIMENT

Figure 1:
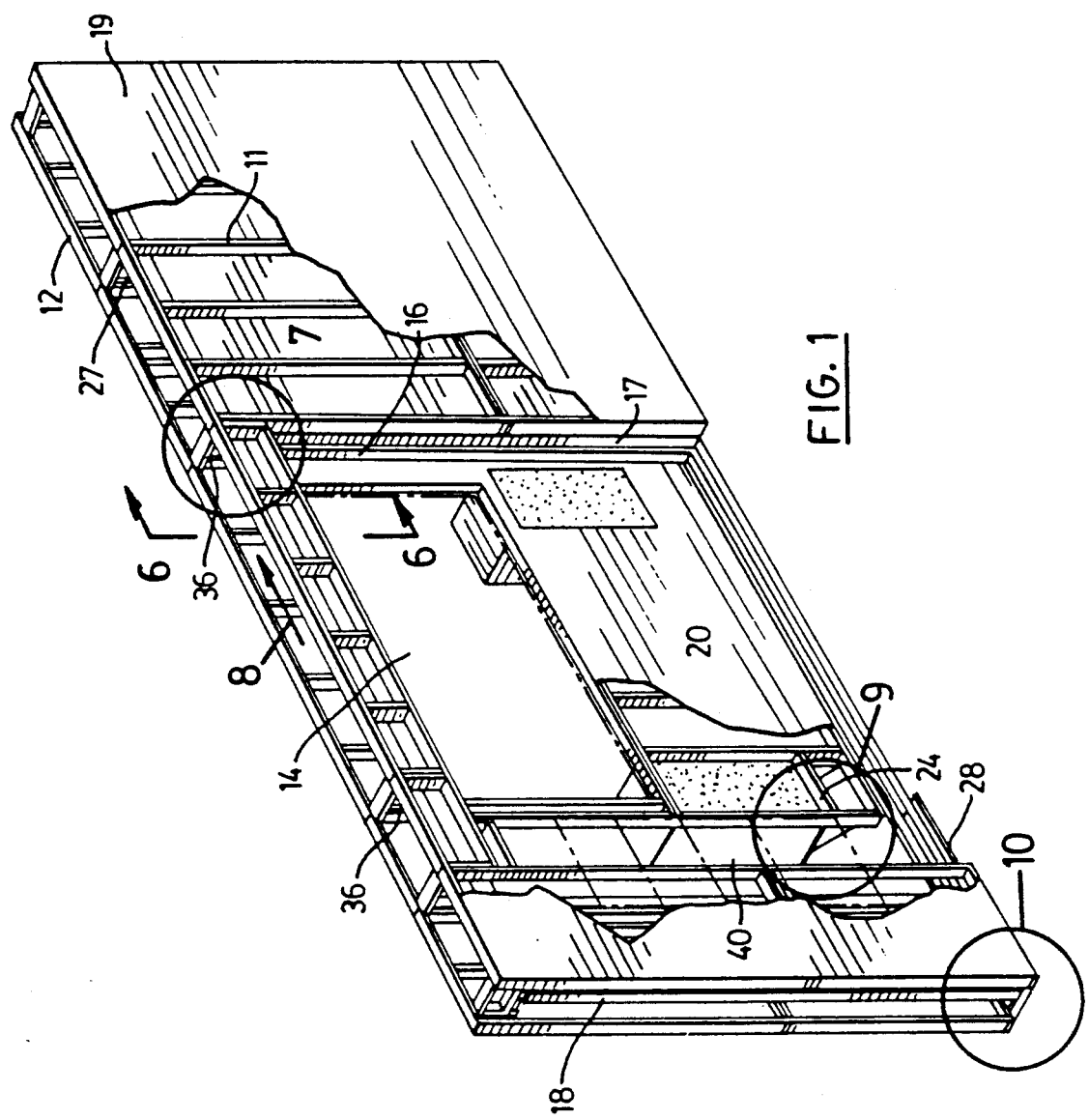
FIG. 1 is a perspective view of a display wall assembly.
Figure 2:
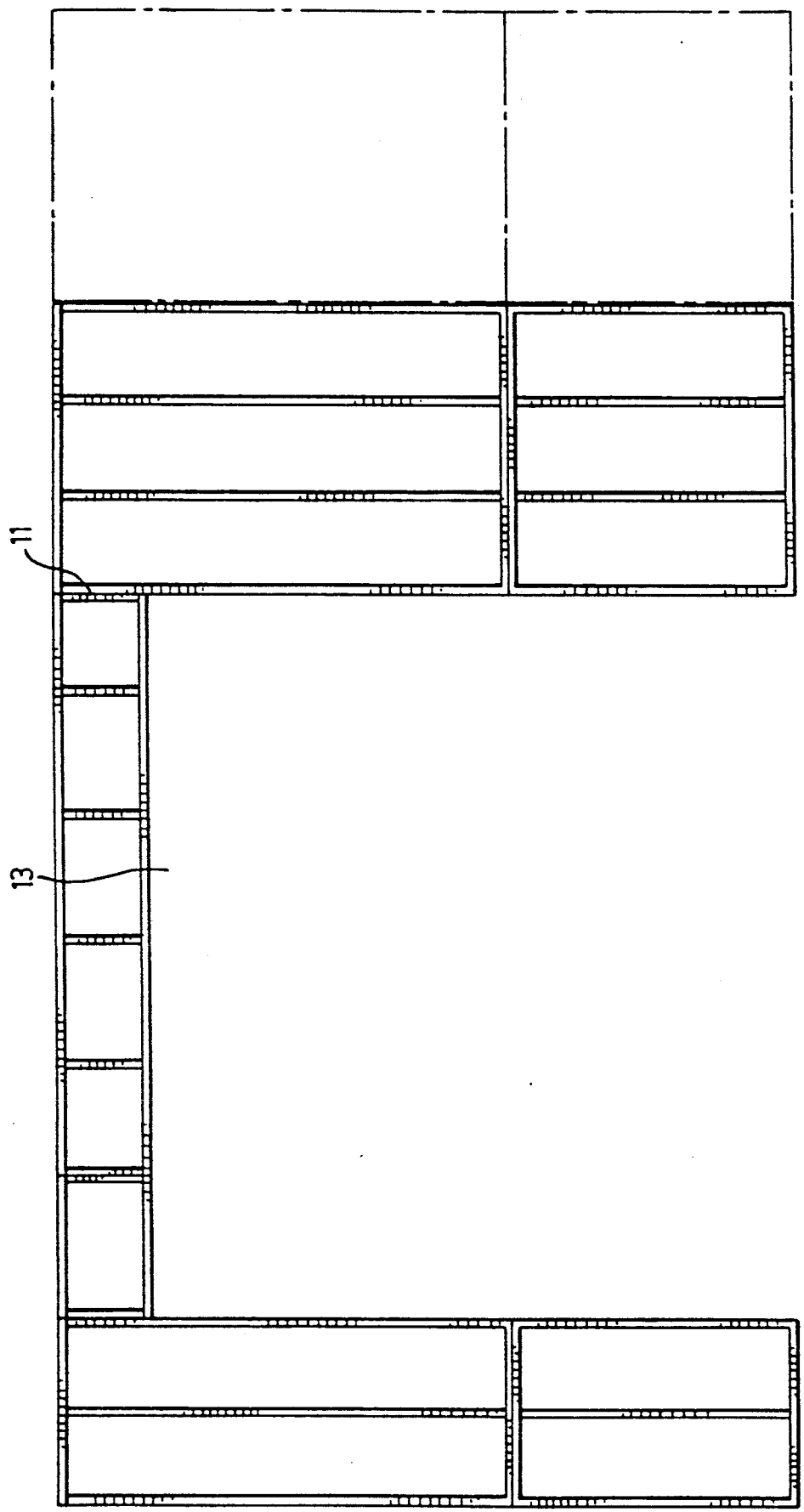
FIG. 2 is a front view of a modular front frame.

As appears in FIG. 1, FIG. 2, FIG. 3 and FIG. 6, the display wall assembly basically comprises a front portion 11, a rear portion 12 which, when assembled with the front portion 11, provides between them a storage space, a display area 13, shown in FIG. 2 which provides an opening 14 through the front portion 11 and rear portion 12, a projector screen unit 15 stored in the storage space, and movable across the opening 14, a whiteboard panel 16 movable sideways from the storage space to cover the opening 14, a right cover panel 17 and a left cover panel 18 which are stored in and movable from the opposite sides of the storage space to cover the display area 13, and a sound absorptive panel 19 covering the front side of the front portion 11.

Figure 3:
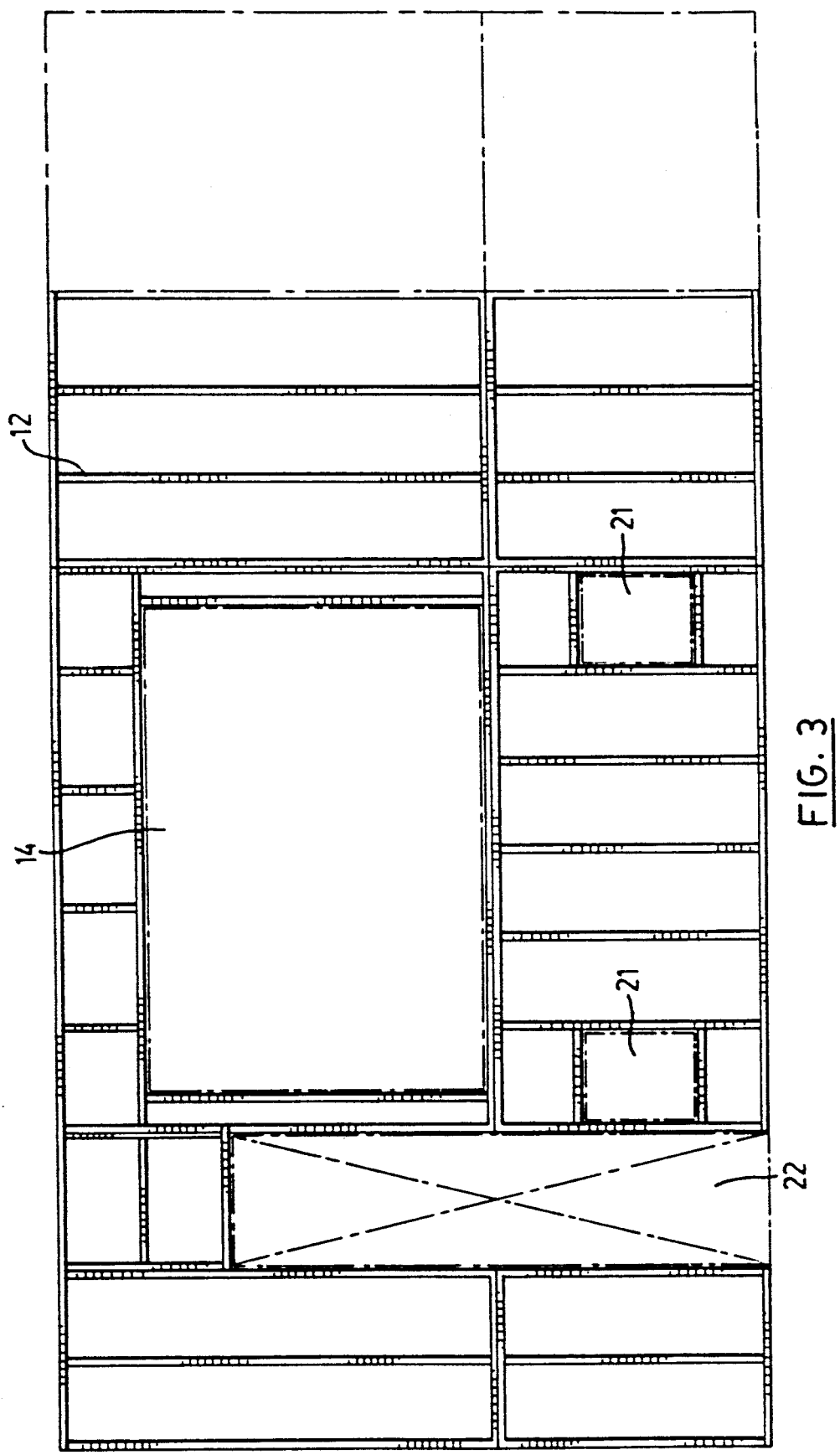
FIG. 3 is a front view of a modular rear frame.
Figure 6:
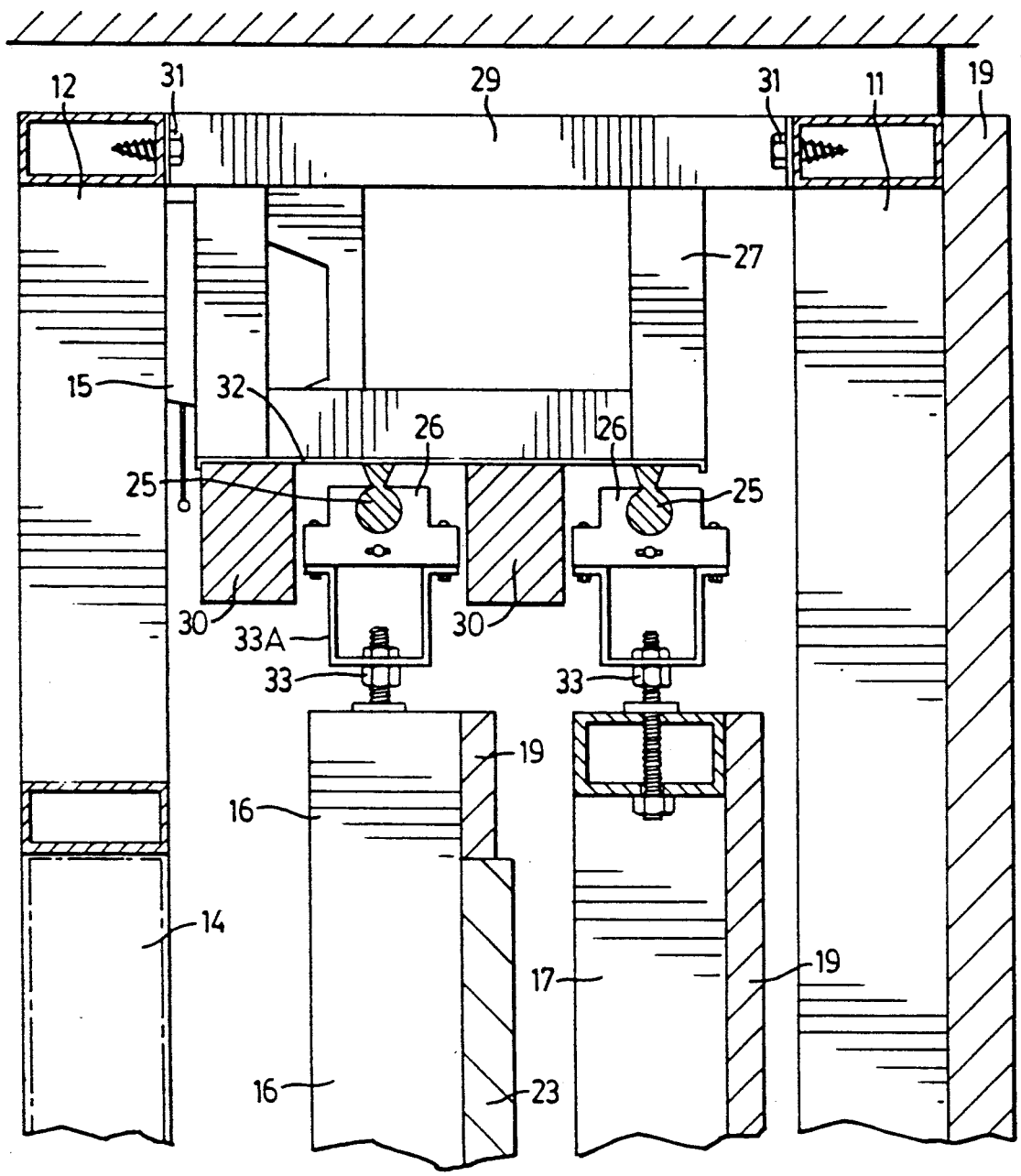
FIG. 6 is a more detailed sectional view, on an enlarged scale, taken along the line 6—6 in FIG. 1.
Figure 7:
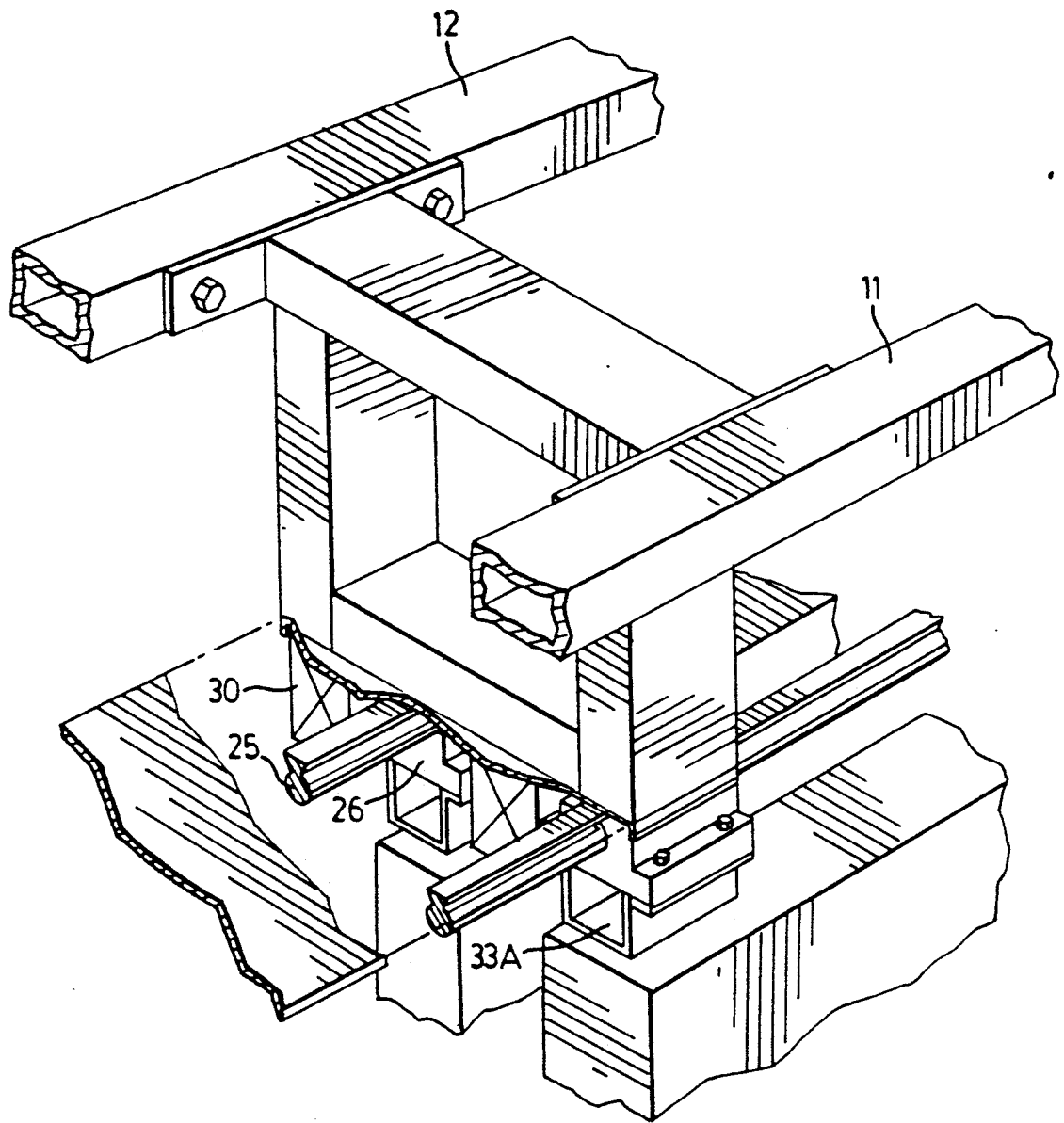
FIG. 7 is an enlarged perspective view of detail 7 of FIG. 1.

The front portion 11 and rear portion 12 are made from steel tubing, shown in FIG. 6 and FIG. 7, and constructed from modules shown in FIG. 2 and FIG. 3 respectively. All modules are prefabricated and can be easily assembled by bolts and nuts or tapping screws to provide a wall assembly in desired sizes and shapes. The display area 13 in the front portion 11, shown in FIG. 2, is to provide an opening space for displaying visual messages and audio signals and for adjusting the audio visual equipment. An are on the rear portion 12 facing and in accordance with the display area 13 in the front portion 11 is covered by types of decorative trim 20 shown in FIG. 1 and has the opening 14. Other openings 21, 22, are shown in FIG. 3. The opening 14 is a big aperture for a screen for projecting a television from the rear, and the openings 21 are two small apertures for loudspeakers. The opening 22 is a space for a set of audio visual equipment not shown in the Figures, and can be covered by the left cover panel 18. The opening 14 and the openings 21 can be covered by the right cover panel 17.

The sound absorptive panel 19 covering the front side of the front frame 11 is to provide the whole wall assembly with a good audio performance, and can be prepared in shapes and sizes which are appropriate for the modules of the front portion 11, and assembled with it by any well known mechanical means.

Figure 5:
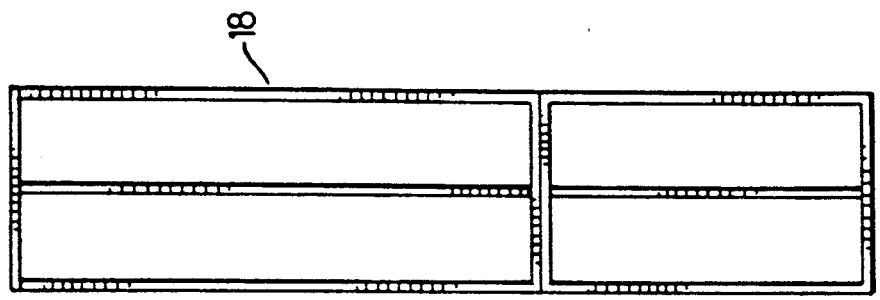
FIG. 5 is a front view of the modular frame of a left cover panel.
Figure 4:
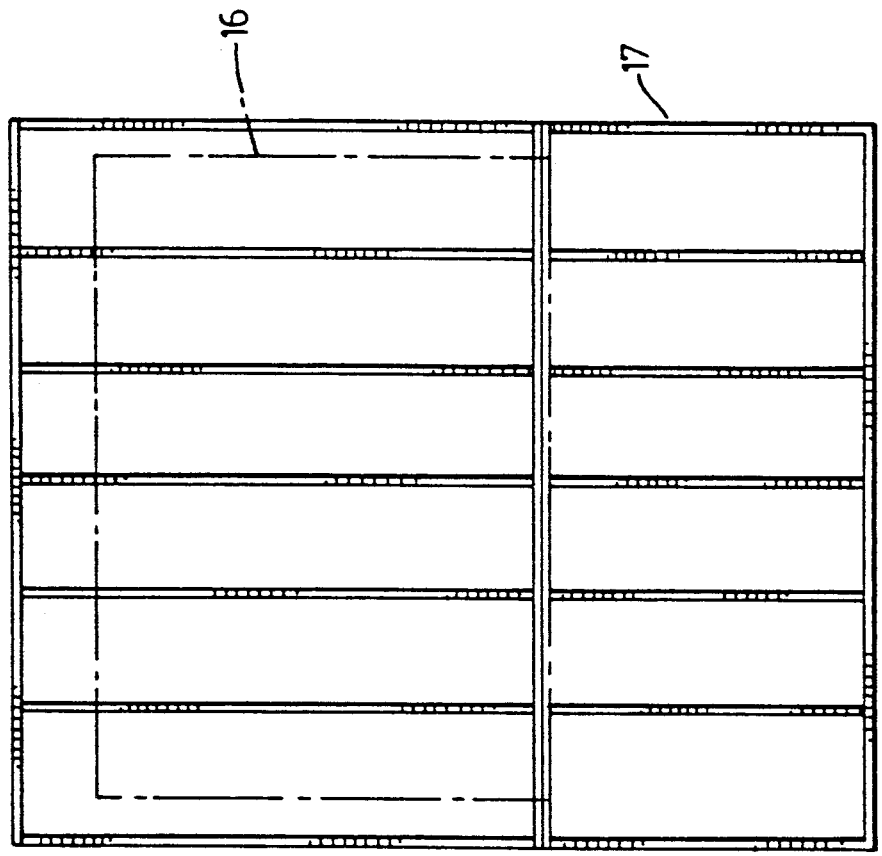
FIG. 4 is a front view of the modular frame of a right cover panel, showing in broken lines the size of a whiteboard panel that can cover part of a display area of the wall assembly.

The right and left cover panels 17 and 18 are framed by aluminum tubing and covered by decorative trims 20 shown in FIG. 6. The widths of the right and left cover panels 17 and 18 are a little larger than the width of the opening 14 and the opening 22 respectively and wide enough to close the display area 13 in the front portion 11 if the right and left cover panel 17 and 18 are put together side by side. They are also constructed from prefabricated modules, shown in FIG. 4 and FIG. 5.

The whiteboard panel 16 is also framed by aluminum tubing and covered by a sheet of whiteboard 23 and decorative trims 20 shown in FIG. 6. The sheet of whiteboard 23 has an area corresponding to the opening 14 and the whiteboard panel 16 is similar in shape and size to the right cover panel 17.

Figure 9:
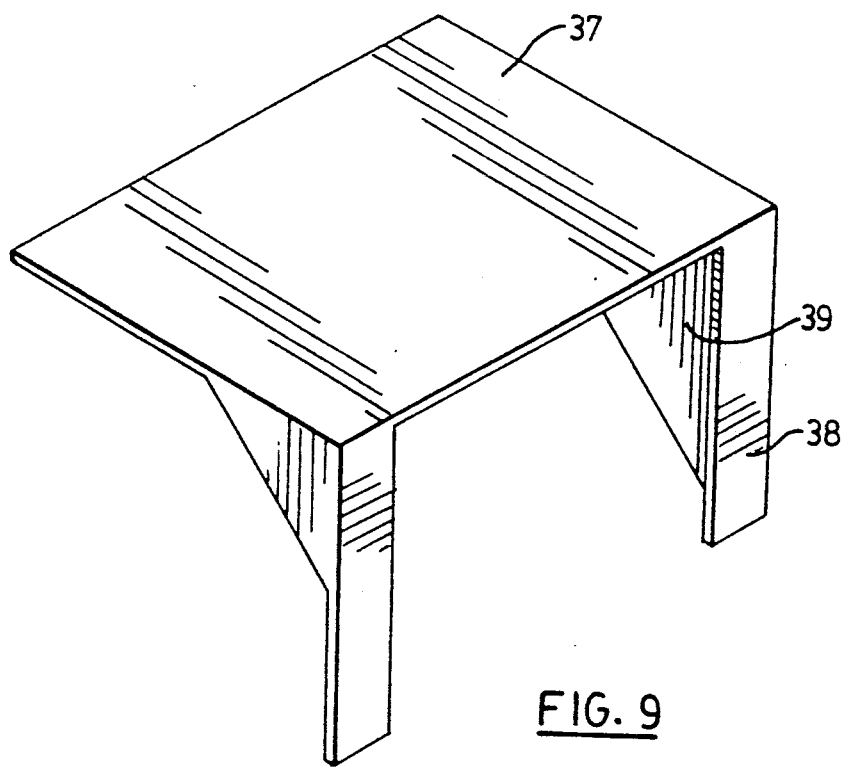
FIG. 9 is an enlarged perspective view of detail 9 in FIG. 1.

The illustrated wall assembly of the present invention includes two loudspeaker stands 24 shown in FIG. 1 and FIG. 9, linear shafts 25 shown in FIG. 6 and FIG. 7, for guiding and supporting the movable whiteboard panel 16 and the movable cover panels 17 and 18, linear bearings 26, shown in FIG. 6 and FIG. 7 connecting the whiteboard panel 16 and the cover panels 17 and 18 respectively with the linear shafts 25 movably along them. Moreover, such an embodiment may also include spacers 27 and a bottom pan 28, shown in FIGS. 1, 6 and 10, which both connect and space the front portion 11 and the rear portion 12.

The spacers 27 are made from steel tubing and are of generally rectangular cross-section having a longer side 29 at the top, shown in FIG. 6; the longer side 29 is long enough to provide a storage space between the front portion 11 and rear portion 12 to accept the cover panel 17 and 18, the whiteboard panel 16, an air drive system 30, shown in FIGS. 6 and 7, and the electrically operated projector screen unit 15.

The spacers 27 are provided at intervals along the length of the top of the wall assembly shown in FIG. 1, and fixed thereto by their longer sides 29, and by tapping screws 31, on the inner sides of the front and rear portions 11 and 12, shown in FIG. 6.

In FIG. 6, a sheet of metal pan 32 is provided to form a base for the linear shafts 25 and the air drive system 30, extending longitudinally to allow movement of the right and left cover panels 17 and 18. The metal pan 32 is fixed on the under-face of the spacers 27, by suitable mechanical means. The sheet metal pan 32 is preferably made in a standard length for easy shipping.

The pair of linear shafts 25 extend along the length of the metal pan 32 and are fixed by tapping screws on their under-face. The linear shafts, which are of inverted keyhole cross-section, key into correspondingly shaped grooves in the linear bearings 26.

The cover panels 17, 18 and the whiteboard panel 16 are suspended from brackets 33A secured to the undersides of the bearings 26, the suspension means comprising adjustment screws 33 for adjusting the heights of the panels.

Two sets of air drive systems 30 are provided behind the two linear shafts 25 respectively and are fixed on the under surface of the metal pan 32 as shown in FIG. 6 and FIG. 7. The air drive systems 30 include a set of pulleys and cables (not shown in the Figures) which are used to pull the cover panels 17, 18, and the whiteboard panel 16, to slide from the storage space into and out of the display area.

Figure 8:
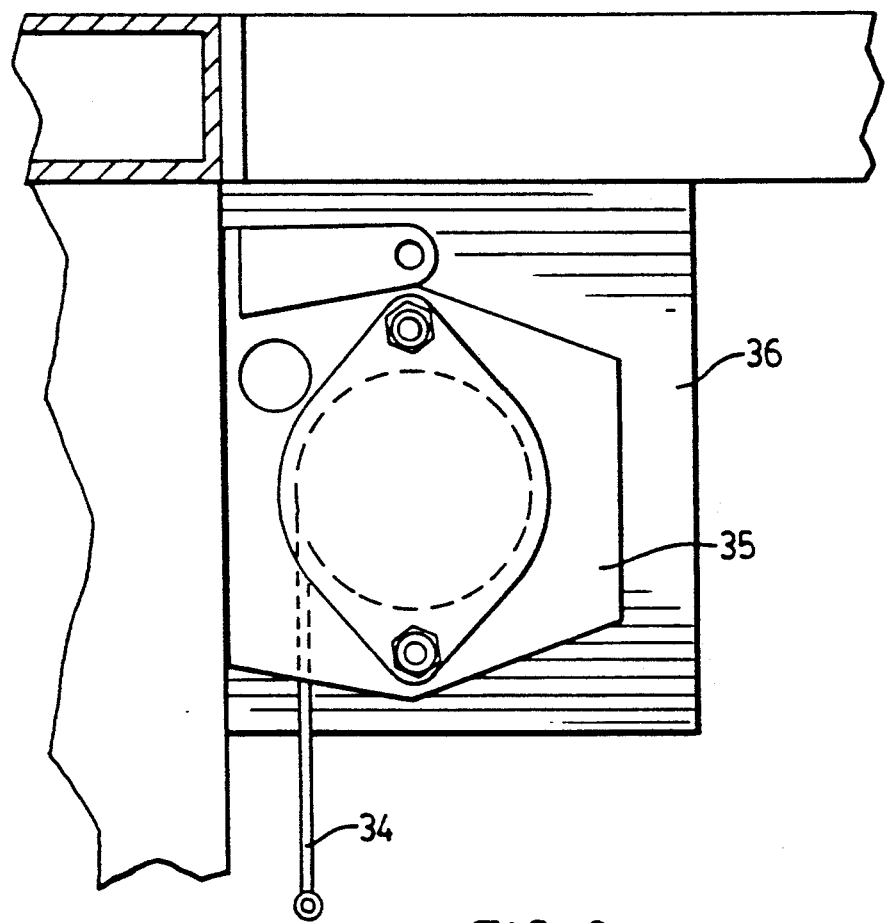
FIG. 8 is an enlarged sectional view in the direction of arrow 8 of FIG. 1.

The projector screen unit 15 is provided in the storage space at the top of the wall assembly above the opening 14, as shown in FIGS. 1 and 6. The projector screen unit 15 comprises a screen 34 for the slide projector, a screen housing 35 and two supporting plates 36 at its two ends as shown in FIGS. 1 and 8. The projector screen unit 15 is placed between two top spacers 27 and fixed thereto by its two supporting plates 36. The spacing between the two spacers 27 corresponds to the width of the projector screen unit 15 as well as that of the opening 14. The screen 34 can be driven down from its housing 35 by a built-in electrical motor (not shown) to cover the opening 14 for displaying the slide projection. The projector screen unit 15, however, is located behind the whiteboard panel 16 when both are placed in the opening 14.

Two speaker stands 24, supporting loudspeakers 40, are mounted on and behind the rear portion 12, adjacent to and below the ends of the opening 14. Each speaker stand 24 comprises a seating surface 37, two legs 38 and two webs 39 as shown in FIG. 9 and is fixed on the back of the rear portion 12.

The bottom pan 28 is provided along the bottom of the wall assembly for its entire length to connect the front portion 11 and rear portion 12. The bottom pan 28 is U-shaped in cross-section and is assembled through its sides with the front and rear portions 11 and 12, respectively, by tapping screws.

Figure 10:
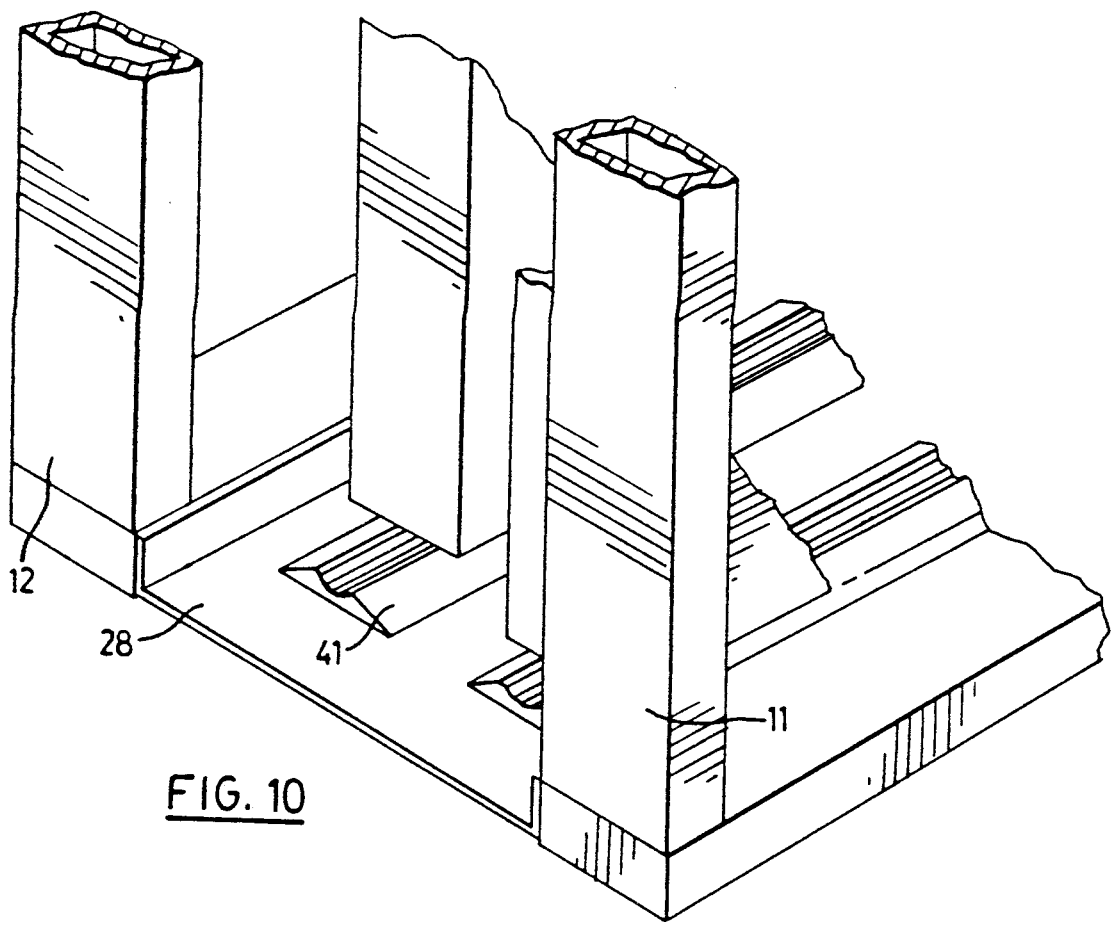
FIG. 10 is an enlarged perspective view of detail 10 in FIG. 1.

The display wall assembly preferably also includes a pair of bottom tracks 41 provided on the bottom pan 28 to support and guide the movable cover panels 17 and 18 and the movable whiteboard panel 16, as shown in FIGS. 1 and 10. The pair of metal bottom tracks 41, each having a longitudinal groove of V-shaped cross-section are fixed on the bottom pan 28 by tapping screws. These bottom tracks 41 are positioned in accordance with the linear shafts 25 to support and guide, in combination with the linear shafts 25, the cover panels 17 and 18 and the whiteboard panel 16. Both the pan 28 and the bottom tracks 41 can be prefabricated in certain standard lengths.

When the cover panels 17 and 18 are opened, the right cover panel 17 and the left cover panel 18 are parted and slide into the storage space between the front frame 11 and the rear frame 12 at opposite sides of the opening 14. After the audio visual equipment located in the opening 22 has been adjusted, the left cover panel 18 usually is closed to cover the audio visual equipment while the rest of the display area 13 is exposed under working conditions of the wall assembly. When the wall assembly is working, both the whiteboard panel and the projector screen are available for the visual display. Meanwhile the audio signals are conveyed by the two loudspeakers 40 standing on the speaker stands 24. An additional option for displaying visual messages is to use a set of television projections not shown in the Figures. The television set is placed in a proper position behind the wall assembly and a suitable screen is provided behind the opening 14 so that the pictures projected from the television projector can be shown on the screen.

The present invention is not particularly limited by the above-mentioned embodiments. There are also possible alternatives with regard to the present invention. For example, the display area can be placed either in the center of the wall assembly or in the right or left parts of the wall assembly; the cover panel can be either a single right or left door, or two bi-parting center doors; the television projection can be arranged either from the rear or from the front of the wall assembly.

I claim:

1. A wall assembly for displaying visual messages comprising:
a front sound absorption portion, a rear portion which when assembled with said front portion provides between them a storage space, a display area providing an opening through said front and rear portions, a projector screen unit stored in said storage space and movable across said open space, a whiteboard panel movable sideways from said storage space to cover said opening, a right cover panel and a left cover panel both stored in and movable from opposite sides of said storage space to cover said display area.

2. A wall assembly as claimed in claim 1, wherein said display panel includes an erasable writing surface.

3. A wall assembly as claimed in claim 1, wherein the front and rear portions are prefabricated in modules.

4. A wall assembly as claimed in claim 1, including loudspeaker stands for supporting loudspeakers, linear shafts for guiding and supporting said movable whiteboard panel and said movable cover panels, said whiteboard panel and said cover panels having linear bearings on said linear shafts.

5. A wall assembly as claimed in claim 1, including bottom tracks to support and guide said movable cover panels and said movable whiteboard panel.

6. A wall assembly for displaying visual messages comprising:

a front portion, a rear portion which when assembled with said front portion provides between them a storage space, a display area providing an opening through said front and rear portions, a projector screen unit stored in said storage space and movable across said open space, a whiteboard panel movable sideways from said storage space to cover said opening, and at least one cover panel stored in said storage space and movable laterally therefrom to cover said display area.

7. A wall assembly as claimed in claim 6, including loudspeaker stands for supporting loudspeakers, linear shafts for guiding and supporting said movable whiteboard panel and said movable cover panel, said whiteboard panel and said cover panel having linear bearings on said linear shafts.

8. A wall assembly as claimed in claim 6, including bottom tracks to support and guide said movable cover panels and said movable whiteboard panel.

9. A wall assembly as claimed in claim 6, further comprising a sound absorptive panel covering said front portion.

* * * * *